United States Patent
Somasundaram et al.

(10) Patent No.: US 10,009,053 B2
(45) Date of Patent: Jun. 26, 2018

(54) MEASUREMENT AND SIGNALING FOR NETWORK ASSISTANCE TO ENABLE DATA-IC IN SMALL CELL CLUSTERS

(71) Applicant: QUALCOMM Incorporated, San Diego, CA (US)

(72) Inventors: Kiran Kumar Somasundaram, San Diego, CA (US); David Gutierrez-Estevez, Atlanta, GA (US); Aleksandar Damnjanovic, San Diego, CA (US); Tao Luo, San Diego, CA (US); Siddhartha Mallik, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/497,218

(22) Filed: Sep. 25, 2014

(65) Prior Publication Data

US 2015/0092705 A1   Apr. 2, 2015

Related U.S. Application Data

(60) Provisional application No. 61/883,948, filed on Sep. 27, 2013.

(51) Int. Cl.
*H04L 25/03* (2006.01)
*H04B 1/10* (2006.01)
(Continued)

(52) U.S. Cl.
CPC ......... *H04B 1/1027* (2013.01); *H04B 1/7097* (2013.01); *H04J 11/0023* (2013.01);
(Continued)

(58) Field of Classification Search
CPC ...... H04J 11/005; H04J 11/0023; H04J 1/005; H04L 25/0328; H04L 25/03821;
(Continued)

(56) References Cited

U.S. PATENT DOCUMENTS

2009/0197631 A1* 8/2009 Palanki ............. H04W 72/0413
455/522
2010/0009634 A1* 1/2010 Budianu ............. H04W 52/244
455/63.1

(Continued)

FOREIGN PATENT DOCUMENTS

WO  2012125508 A1  9/2012
WO  2013126222 A1  8/2013

OTHER PUBLICATIONS

3GPP, "TR 36.829 v11.0.0", Mar. 2012, pp. 1-83.*
International Search Report and Written Opinion—PCT/US2014/057696—ISA/EPO—dated Dec. 16, 2014.

*Primary Examiner* — Salvador E Rivas
(74) *Attorney, Agent, or Firm* — Nerrie M. Zohn

(57) ABSTRACT

A method, an apparatus, and a computer program product for wireless communication are provided. In one aspect, a user equipment (UE) receives a signal at the UE. The received signal includes a transmission from a serving cell and at least a first interfering transmission. The UE determines a constrained transmission rate associated with the first interfering transmission and cancels the first interfering transmission from the received signal based on the constrained transmission rate. In another aspect, a wireless communication apparatus determines a constrained transmission rate for a transmission on one or more reduced-rate resources. The wireless communication apparatus signaling the constrained transmission rate to a user equipment (UE).

30 Claims, 17 Drawing Sheets

(51) Int. Cl.
*H04J 11/00* (2006.01)
*H04B 1/7097* (2011.01)
*H04W 24/08* (2009.01)
*H04W 72/08* (2009.01)

(52) U.S. Cl.
CPC ....... *H04L 25/03821* (2013.01); *H04W 24/08* (2013.01); *H04W 72/082* (2013.01)

(58) Field of Classification Search
CPC ... H04L 1/0001; H04L 1/0002; H04L 12/569; H04W 52/24; H04B 1/7097; H04B 1/719
See application file for complete search history.

(56) References Cited

U.S. PATENT DOCUMENTS

| | | | |
|---|---|---|---|
| 2012/0128087 A1* | 5/2012 | Miyoshi | H04L 27/2647 375/260 |
| 2012/0142296 A1* | 6/2012 | Cotterill | H04B 7/0877 455/230 |
| 2013/0072246 A1* | 3/2013 | Nobukiyo | H04W 72/08 455/512 |
| 2013/0077578 A1 | 3/2013 | Wang et al. | |
| 2013/0121200 A1* | 5/2013 | Li | H04L 1/0003 370/252 |
| 2013/0223258 A1* | 8/2013 | Seo | H04W 24/02 370/252 |
| 2014/0269454 A1* | 9/2014 | Papasakellariou | H04W 52/34 370/280 |

* cited by examiner

MEASUREMENT AND SIGNALING FOR NETWORK ASSISTANCE TO ENABLE DATA-IC IN SMALL CELL CLUSTERS

CROSS-REFERENCE TO RELATED APPLICATION

This application claims the benefit of U.S. Provisional Application Ser. No. 61/883,948, titled "MEASUREMENT AND SIGNALING FOR NETWORK ASSISTANCE TO ENABLE DATA-IC IN SMALL CELL CLUSTERS" and filed on Sep. 27, 2013, which is expressly incorporated by reference herein in its entirety.

BACKGROUND

Field

The present disclosure relates generally to communication systems, and more particularly, to a method, a computer program product, and an apparatus for measuring and signaling for network assistance to enable data interference cancellation.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. In one aspect, a method of wireless communication for a user equipment (UE) is provided. The method includes receiving a signal at the UE. The received signal includes a transmission from a serving cell and at least a first interfering transmission. The method also includes determining a constrained transmission rate associated with the first interfering transmission. The method also includes canceling the first interfering transmission based on the constrained transmission rate.

In one aspect, a method of wireless communication is provided. The method includes determining a constrained transmission rate for a transmission on one or more resources. The method further includes signaling the constrained transmission rate to a user equipment (UE).

In one aspect, a user equipment (UE) is provided. The UE includes means for receiving a signal at the UE. The received signal includes a transmission from a serving cell and at least a first interfering transmission. The UE further includes means for determining a constrained transmission rate associated with the first interfering transmission and means for canceling the first interfering transmission based on the constrained transmission rate.

In one aspect, an apparatus for wireless communication is provided. The apparatus includes means for determining a constrained transmission rate for a transmission on one or more resources and means for signaling the constrained transmission rate to a user equipment (UE).

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
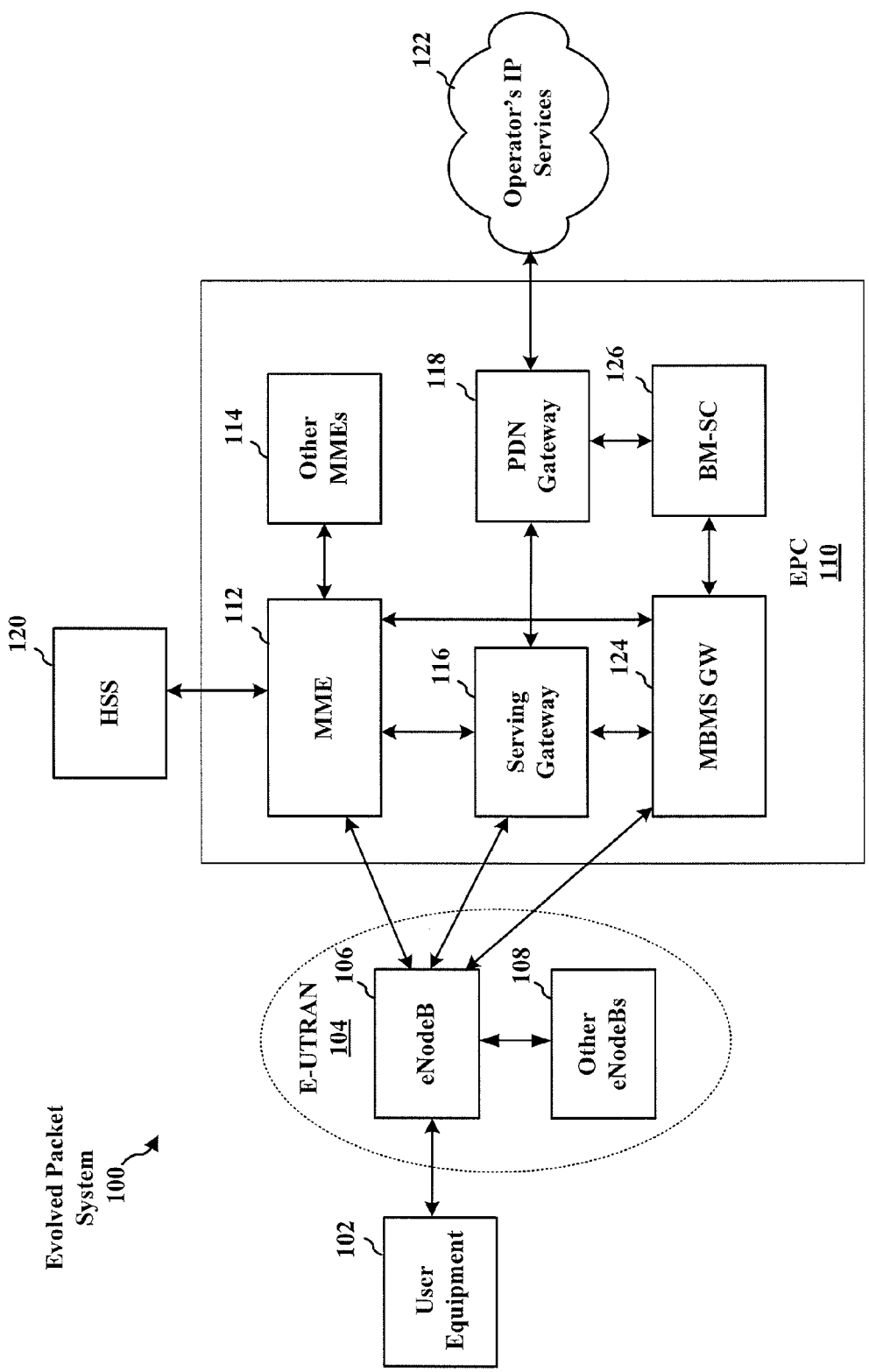
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
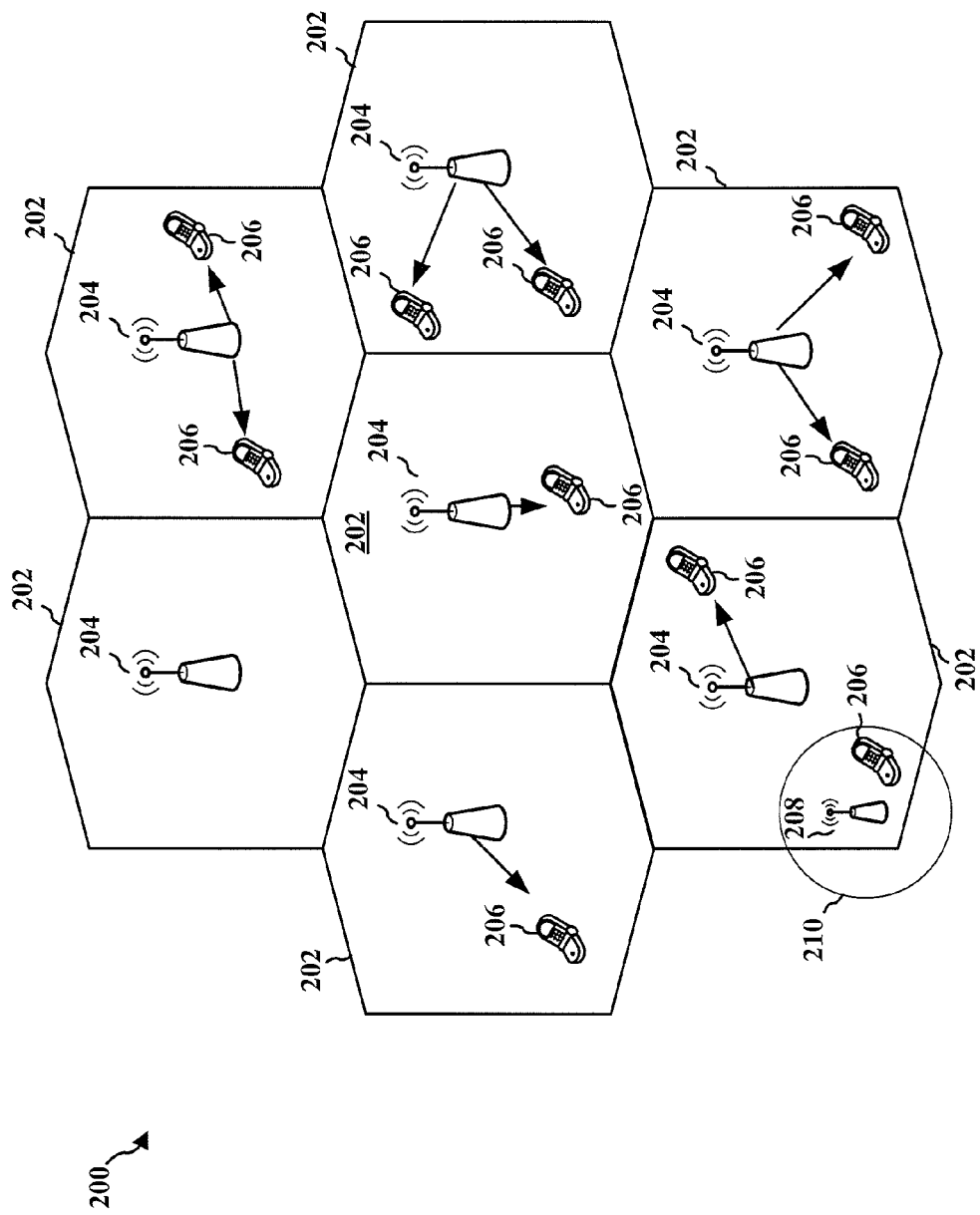
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
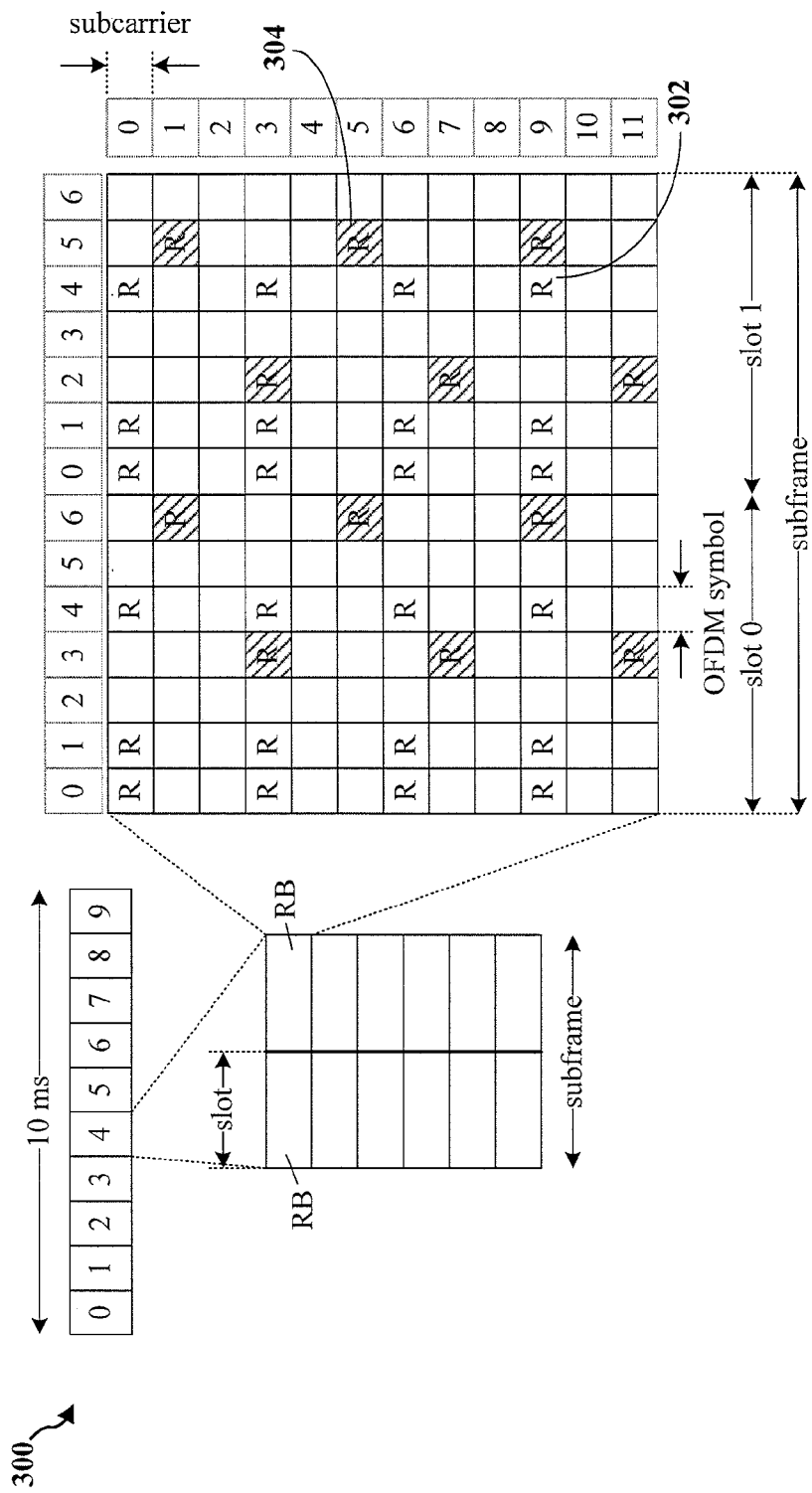
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, for a total of 84 resource elements. For an extended cyclic prefix, a resource block contains 6 consecutive OFDM symbols in the time domain for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
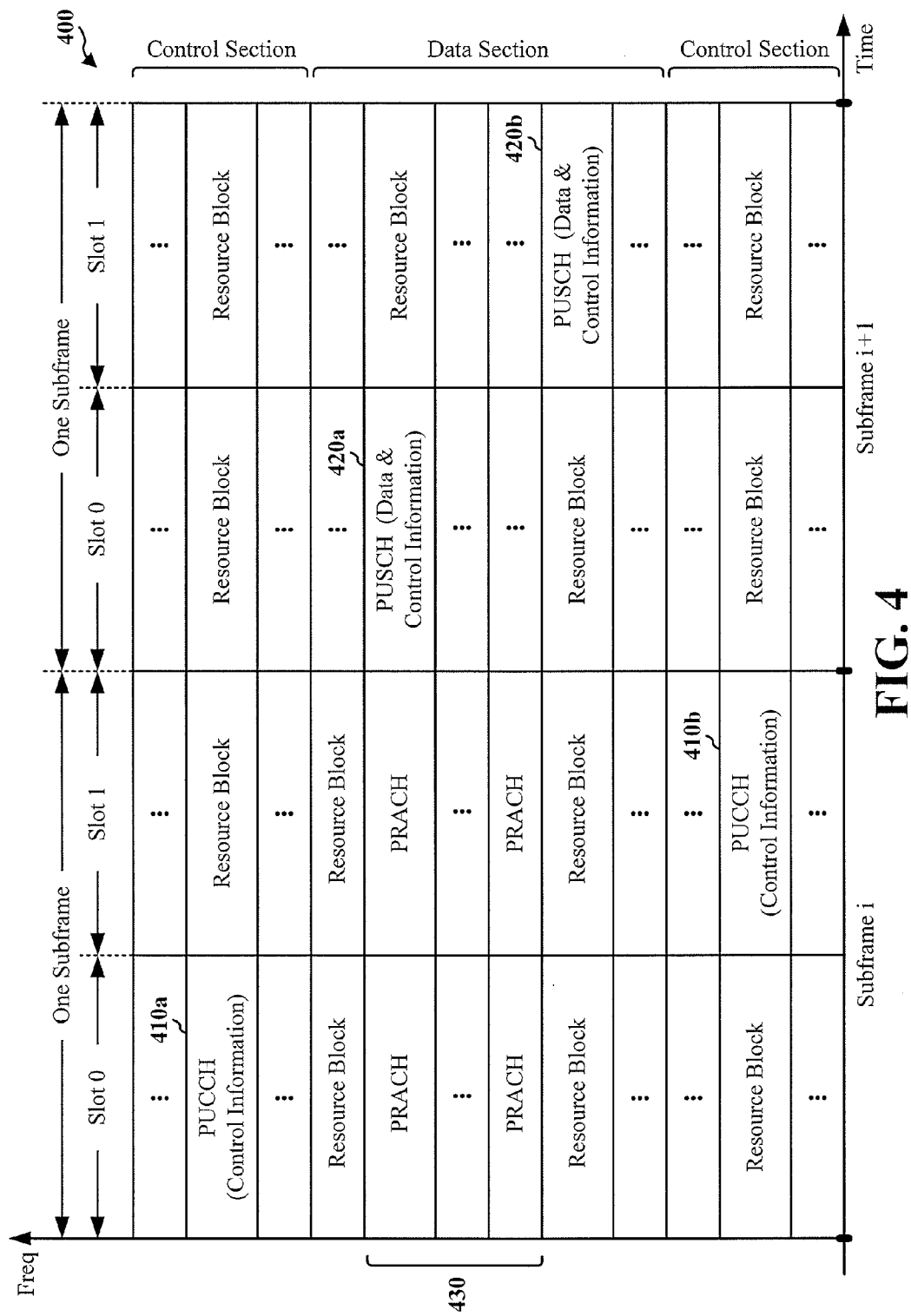
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
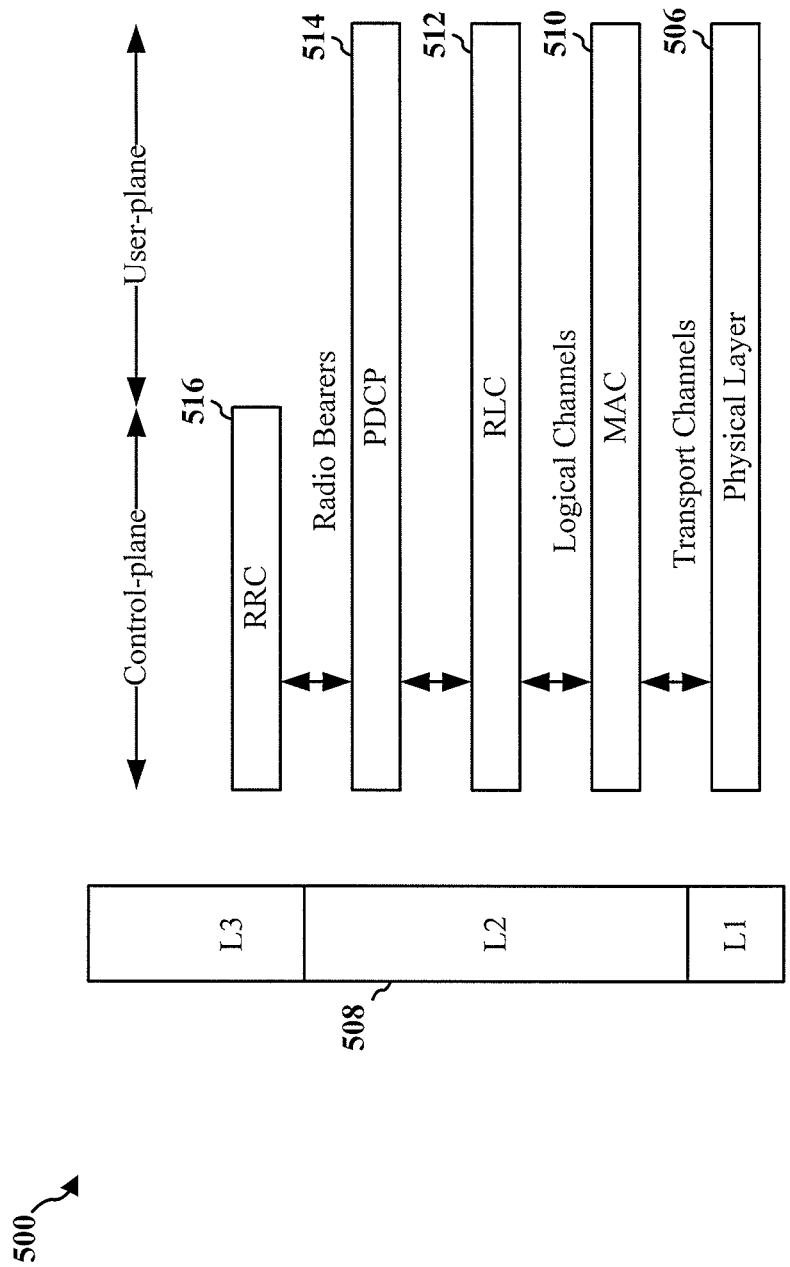
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARM). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
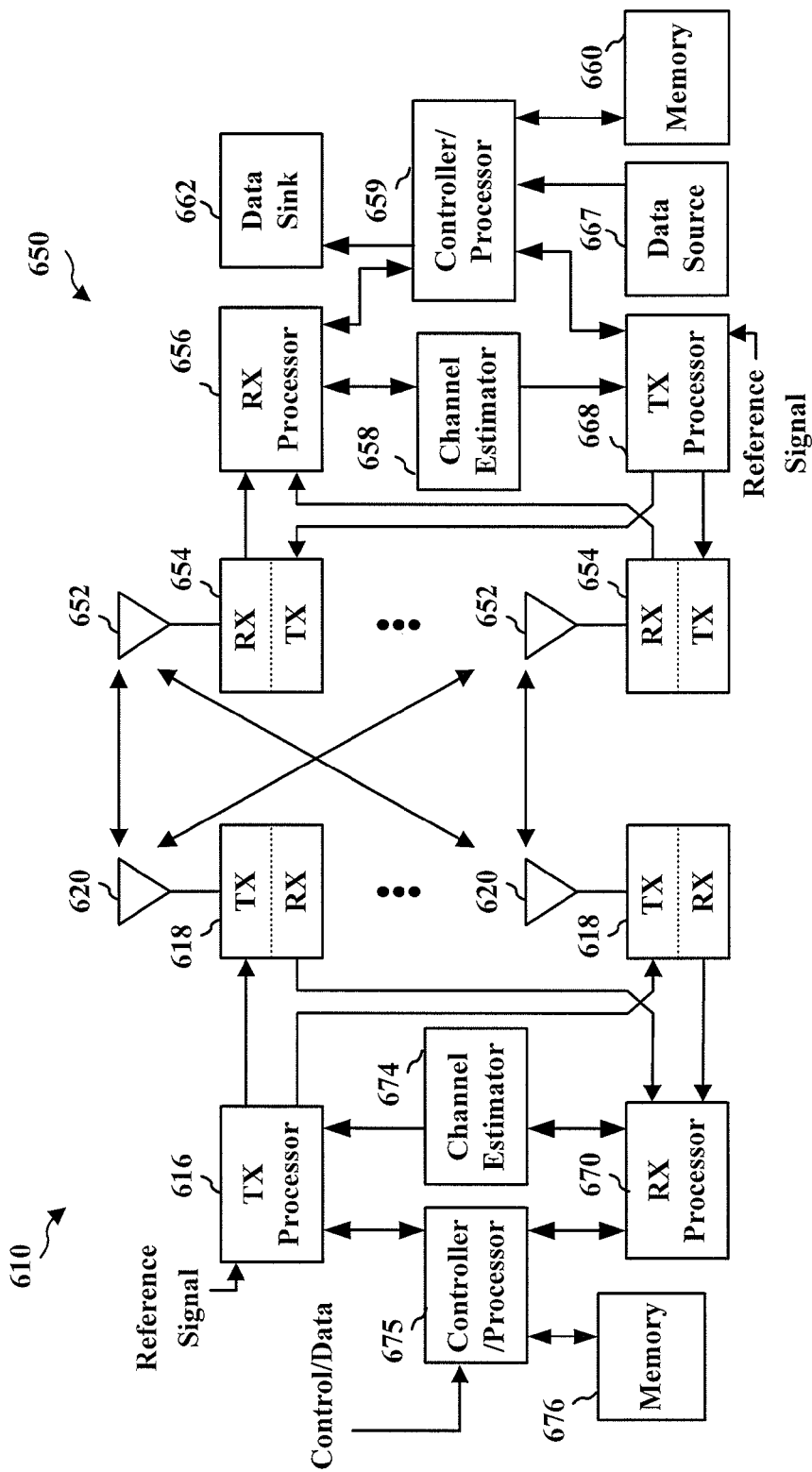
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
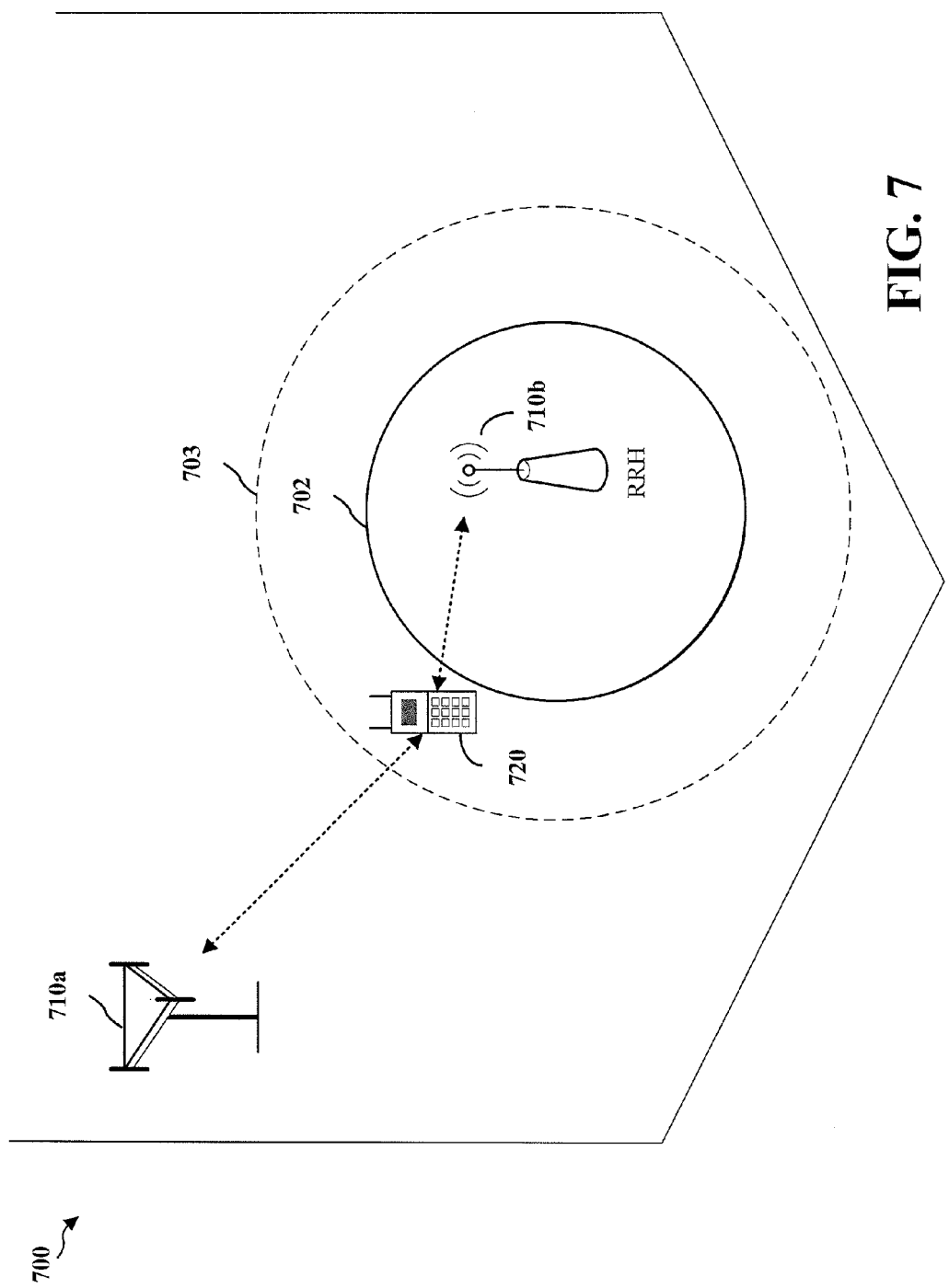
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Figure 8:
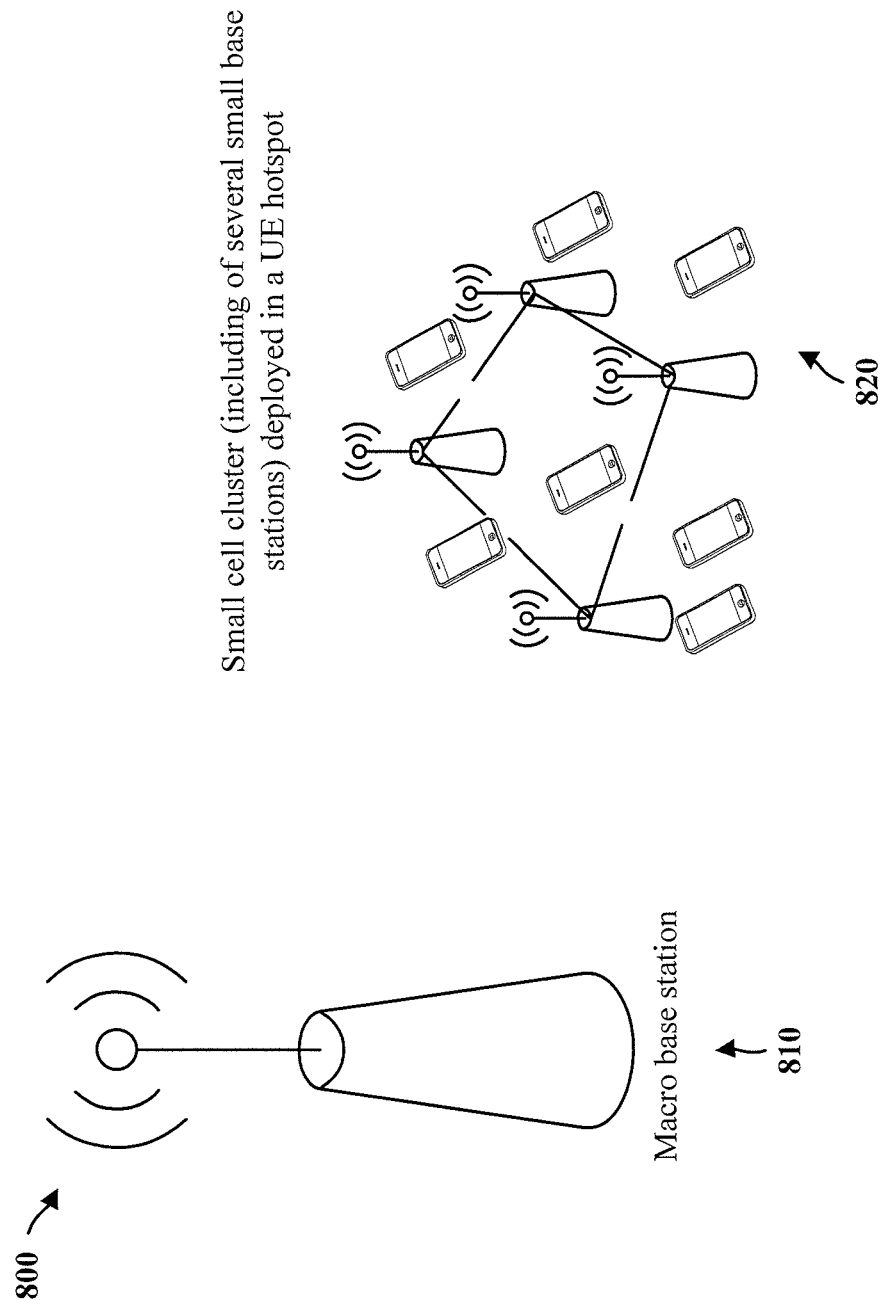
FIG. 8 is an example of a Heterogeneous Network (HetNet).

FIG. 8 illustrates an example of a Heterogeneous Network (HetNet). A HetNet may include a macrocell network and one or more tiers of small cells. The HetNet 800 includes a macro base station 810 and a cluster of small cells 820. The cluster of small cells 820 may be deployed in a hotspot of UEs. A hotspot includes areas with heavy communication demands, and the deployment of the small cell cluster may improve the communication bandwidth. The small cell cluster may be deployed co-channel with a macro cell. The cells of the cluster may communicate via backhaul connectivity between the cells of the cluster. The backhaul connectivity may carry measurements, signaling, and coordination decisions. An X2 interface or fiber optic connection are an examples an applicable backhaul connectivity mechanisms.

In some instances, the UEs may experience interference from, e.g., transmissions of a macro cell or small cells of the cluster of a HetNet. Some of these interferers might be dominant (really strong compared to the other interferers). Cancelling or mitigating a dominant interferer may improve the link capacity/reliability of the serving link. The term "cancel" may be used to refer to cancelling and/or mitigating an interfering signal.

The interference cancellation or mitigation may be performed via, e.g., code word level interference cancellation (CWIC), Symbol level interference cancellation (SLIC), or using almost blank subframe (ABS) methods. In CWIC, the UE may decode the interfering data in a received interfering signal and then cancel the data. For CWIC, the UE may perform the cancellation based on the spatial scheme, the Modulation and Coding Scheme (MCS), the transmission mode (e.g., whether it is based on UE-RS or CRS), the Resource Block (RB) allocation, the Redundancy Version (RV), the control region span (PCFICH value), or the traffic-to-pilot ratio (TPR) associated with the interfering cell signal. In SLIC, the UE detects the interfering modulation symbols from the received interfering signal and cancels them. For SLIC, the UE may perform the cancellation based on the spatial scheme, the modulation order, transmission mode (e.g., whether it is based on UE-RS or CRS), the RB allocation, the control region span (PCFICH value), or the TPR associated with the second cell signal. In contrast to SLIC and CWIC, which refer to interference cancellation techniques, ABS generally refers to interference avoidance, whereby a subframe with no data (e.g., the subframe may include only reference signals which are easy to cancel) is transmitted by the interfering cell at designated subframes to avoid generating interference at a UE.

The cancellation efficiency (e.g., amount by which an interfering small cell can be suppressed at a UE) is a function of the rate at which the interfering small cell schedule its UEs. If the interfering cell schedules and transmits at a low rate, then the interference can be better canceled or mitigated.

Figure 9:
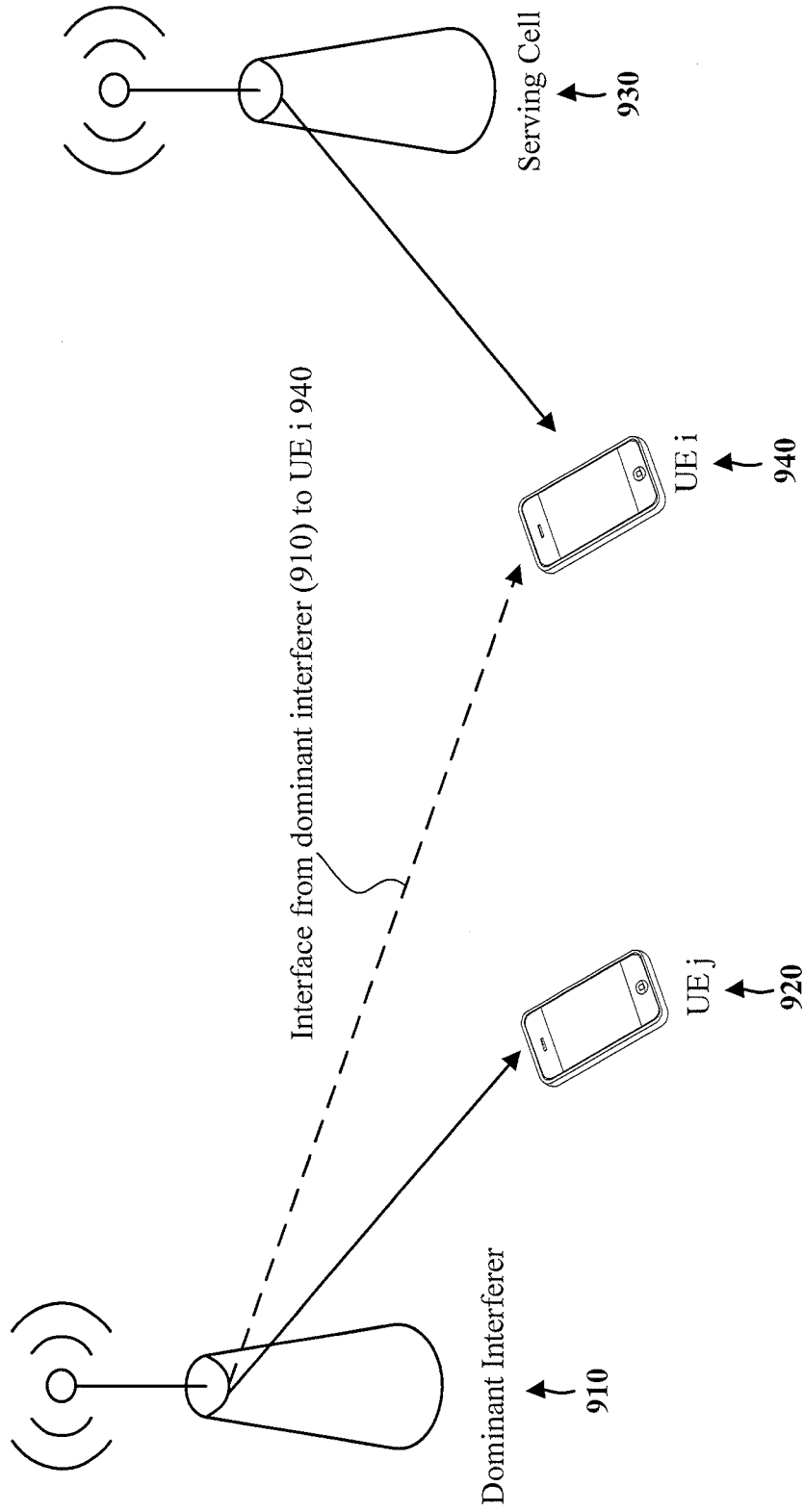
FIG. 9 is an example of interference cancellation for a UE.

FIG. 9 illustrates an example of interference cancellation for a UE. The UE i 940 is served by the serving cell 930. The UE j 920 is served by a neighboring cell 910. In the configuration of FIG. 9, the neighboring cell 910, which communicates with the UE j 920, is a dominant interferer to the UE i 940. The neighboring cell 910 schedules transmissions using QPSK, which allows for better cancellation efficiency of interfering signals at the UE i 940 than transmissions scheduled using 64 QAM (assuming the same coding rate). At the same coding rate, QPSK is of lower data rate than 64 QAM. In this example, the transmission rates of the interferer may refer to modulation and coding schemes (MCSs). Examples of transmission rates may include modulation orders (MO) and transmission ranks.

In an aspect, if the dominant interferer (e.g., transmission from a small cell) for each UE reduces its transmission rate (e.g., in bps/Hz), then a UE experiencing interference may better cancel interfering transmissions from the interferer. In other words, the UE can cancel the interference more effectively if the interfering transmission is transmitted at a lower rate. The reduced transmission rate may also boost the link capacity/reliability of the serving cell.

Although the dominant interferer 910 can schedule and transmit to its UE j 920 at a potentially higher rate (e.g., higher MCS index), the dominant interferer 910 may be constrained to use a lower rate (e.g., lower MCS index). Such reduced rate may be referred to as a constrained transmission rate.

In another aspect, the UE i 940 may perform certain measurements and report the measurement results to the network for computation of the constrained transmission rate. In one aspect, the UE i 940 may report measurements to reflect how dominant the strongest interferer is relative to other interferers and/or how much gain the UE i 940 may expect to gain from canceling the strongest interferer (e.g., the significance of the interference).

In another aspect, the network may compute a constrained transmission rate on certain resources (e.g., time-frequency resources) for each of the small cells of the cluster. The network may compute the constrained transmission rate via message-passing of the UE measurements on the small cell cluster backhaul. In one aspect, each of the small cells may have different constrained transmission rates on different sets of resources. Such sets of resources may be called reduced-rate resources. The small cells may then configure the constrained rate on certain reduced-rate resources that the network has determined for a given small cell. The network signals these resources and constrained transmission rates to the UEs, which may cancel these cells on the reduced-rate resources.

In one example, the serving cell 930 signals to the UE i 940 the constrained transmission rate and the reduced-rate resources of the dominant interferer 910 of the UE i 940. The UE i 940 may then attempt to the cancel an interfering transmission on the dominant interferer's reduced rate resources.

In another example, the UE i 940 may report back the statistics of cancellation results back to the network. In one aspect, the network may adaptively configure the small cell constrained transmission rate and reduced-rate resources on these statistics.

Additional examples on the measurements and relevant link metrics are provided below. In one aspect, the interference is measured according to Signal-to-Interference-and-Noise ratio (SINR). Examples of the relevant link metrics include:

SINR(i): SINR at user i, including all interferers.

$SINR_{-1}(i)$: SINR at user i after removing the strongest interferer (e.g., interferer of highest power). For example, the denominator term of the ratio includes all interferers except the one strongest interferer.

$SINR^{SI}(i)$: A strongest interferer's SINR at user i. For example, the denominator term of the ratio includes serving cell received power.

$SINR^{SI}_{-0}(i)$: A strongest interferer's SINR at user i after removing the serving cell, e.g., power ratio of the strongest interferer relative to the rest of interferers plus noise.

In one aspect, a dominant interferer may be an interferer to user i if the link metric $SINR^{SI}_{-0}(i)$ exceeds a threshold $T_1$. In another aspect, a dominate interferer is an interferer to a user when the cancellation of the interferer causes gains (e.g., improvements) to the SINR (or other signal metric) above a threshold $T_2$. For example, an interferer is significant to user i if the following holds:

$SINR_{-1}(i) - SINR(i) > T_2$

Examples of the measurements performed by UE for interference cancellation are presented below. In one aspect, these measurements are long-term measurements. The measurements may include long term SINR(i). For example, as part of the radio resource management (RRM), the UE may approximate the long term SINR(i) from reference signal received quality (RSRQ) from the serving cell. The measurement reports to the serving cell may include a strongest interferer (SI) cell ID and $SINR^{SI}$. For example, as part of the RRM, the UE may approximate the $SINR^{SI}$ from RSRQ for the strongest interferer.

In another aspect, measurements performed by UE for interference cancellation may include a max rate $R_{max}^{SI}$ (e.g., in term of (bits/s)/Hz) for the dominant interferer, where $R_{max}^{SI}$ represents the maximum transmission rate for the dominant interferer at which the UE can still cancel the dominant interferer. By example, the max rate may refer to the maximum MCS, a maximum MO (Modulation Order), or a rank constraint.

In one aspect, the max rate $R_{max}^{SI}$ is a function of the UE's capability (e.g., certain more advanced UEs are more capable of interference cancellation than older UEs). For example, cancellation may be improved if the UE applies joint interference canceling schemes, including the constrained transmission rate.

In another aspect, the max rate $R_{max}^{SI}$ may be coarse and/or projected rate. This allows for initially starting (e.g., bootstrapping, initiating) the system. Once the process is initiated the transmission rate may be adjusted (e.g., iteratively, or by threshold comparison) to further refine the max rate $R_{max}^{SI}$.

In another aspect, measurements performed by UE for interference cancellation may include a gain (e.g., improvement) from canceling interference. In one example, the gain may be expressed as $SINR_{-1}(i) - SINR(i)$. In another example, the value of $SINR_{-1}(i) - SINR(i)$ is measured or calculated as:

$$SINR_{-1}(i) - SINR(i) = \frac{Intf1 + Intf2 + Intf3 + No}{Intf1 + Intf3 + \ldots + No},$$

where the $Intf_i$ terms are sorted in descending order of received power. In one aspect, these values are filtered values measured on Common Reference Signal (CRS) tones. In other examples, channel strengths may be measured with channel state information reference signals (known as CSI-RS), and interferences may be measured with interference measurement resources (known as IMR).

The network may infer the $SINR_{-i}(i) - SINR(i)$ value from reference signal received power (RSRP) reports to different cells, but such inferred values may not be accurate because of asymmetric cell loading. In one aspect, the UE reporting the cell strengths and loading can determine these values. In one example, if a UE is able to measure that that a second interferer is loaded 50% of the time, the quantity Intf2 in the equation above may be replaced by 0.5*Intf2. This example is one of a heuristic scheme, and other options are also possible. Thus, $SINR_{-i}(i) - SINR(i)$ may in general depend on the loading of the interfering cells.

In one aspect, the measurements are performed on selected subframes (reference subframes). In one aspect, the network may signal the UE a subset of subframes over which these measurements are to be performed. For example, if an interferer has certain subframes configured as ABS subframes, then the UE can be instructed to not use these subframes for the measurements, since there will be no interfering transmissions on these subframes. In one aspect, the measured quantities are filtered or cumulative values, and therefore, they may not reflect short term changes (e.g., SINR changes at sub-frame level granularity). Thus, not all subframes may be useful for the calculations and measurements presented above. For example, if one attempts to measure an interferer, one would need to use a subframe on which the interferer is present. In this fashion, the above calculations (e.g., for $SINR_{-1}(i)-SINR(i)$) may above taking into account the measurements of subframes with no interfering transmissions.

In one aspect, the UE may report the measurements using L3 signaling (e.g., PUSCH). In another example, the UE may report the measurements using aperiodic L2 and L1 signaling.

Examples of network communication and reporting are presented below. In one aspect, the small cells of the cluster may coordinate via backhaul communication to compute at least one of the following values. For example, for each small cell, the values computed may include the reduced-rate resources. The reduced-rate resources may be a subset of time-frequency resources (e.g., subband and/or subframe) on which a given small cell transmits at a constrained transmission rate. In one example, the reduced-rate resource may be at subframe level of granularity (e.g., N out of every M subframes are configured to have reduced-rate). As would be understood by persons of ordinary skill in the art, the scope of the disclosure is not limited by the provided examples. For example, while interferences of small cells are used as examples, the scope of the disclosure may include, e.g., interferences from macro cells.

In one aspect, a UE may receive an interfering transmission sent at a constrained transmission rate on the reduced-rate resources. The constraint may be applied to transmission rate in terms of a maximum MCS (index), a maximum MO (modulation order), or a transmission rank constraint.

In another aspect, the serving cell of the UE may signal the reduced-rate resources (e.g., resources on which the dominant interferer has reduced rate transmissions) to the UE. For example, if the reduced rate resources operate at subframe-level granularity and the constraint is in terms of a maximum MCS index, the serving cell may signal to the UE (e.g., via radio resource control or RRC) the dominant interferer (e.g., the physical cell ID) and/or the reduced-rate subframes configured on the dominant interferer. The signaling may use a bitmap (indicating the reduced-rate subframes) or a configuration index (from among a plurality of pre-determined or signaled configurations that identify resource-constraint combinations).

In one aspect, the signaling from the serving cell helps to save power of the UE. For example, as a result of the signaling from the serving cell, the UE does not need to blindly detect/estimate the interference on every subframe.

In another aspect, the UE provides to the network feedback on the interference cancellation. The UE may periodically report statistics of the cancellation performance. For example, the UE may report the success ratio of cancellation of the dominant interferer. The report may be binary information of whether the UE has canceled the interferer on the reduced-rate resources. Moreover, the UE may report to the network the potential link gain observed from the cancelation. In one aspect, the feedback may be coarse or approximated. In one aspect, these measurements may be used by the network to adapt its decisions on the reduced-rate resources and constrained transmission rate.

Figure 10:
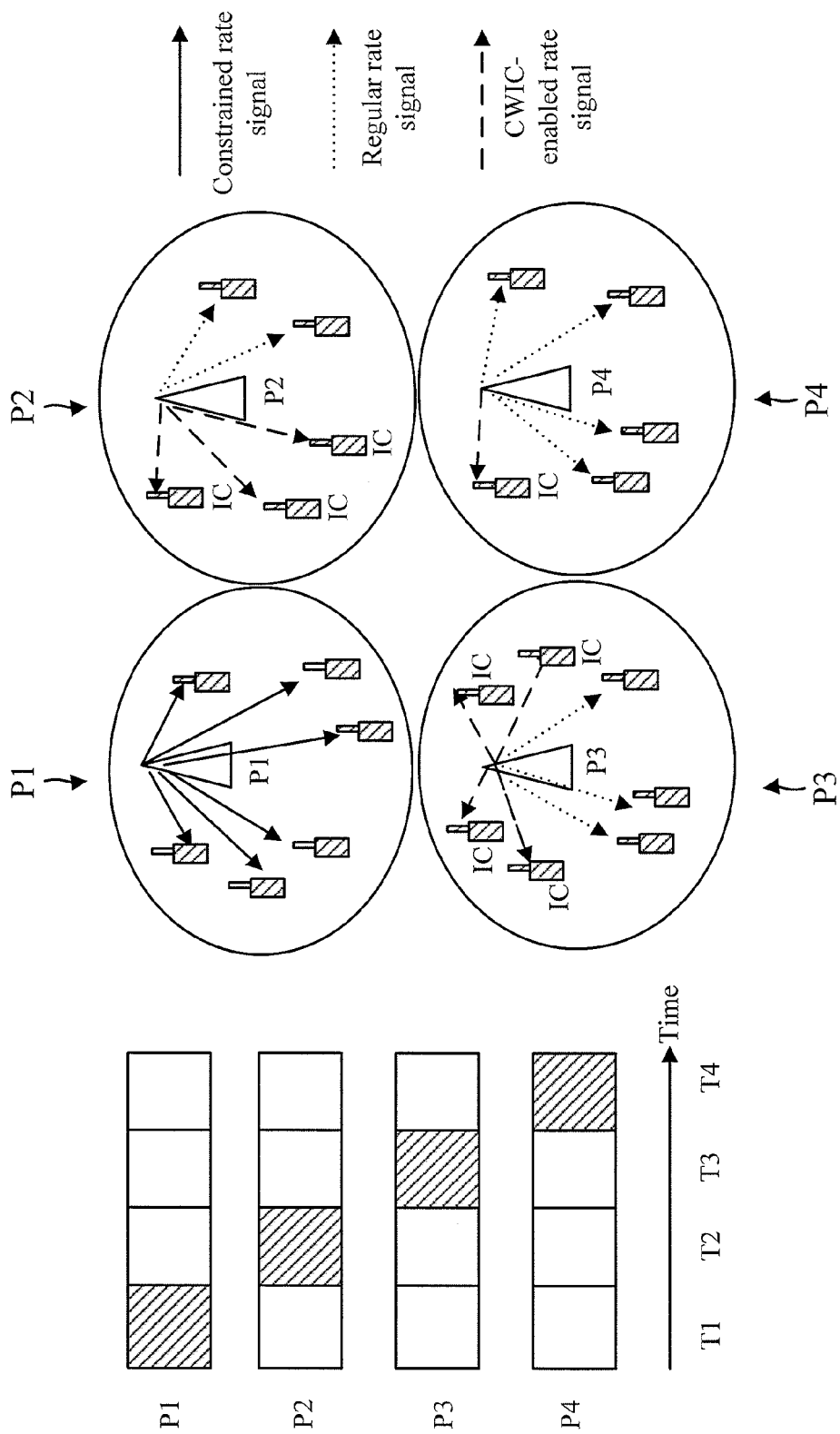
FIG. 10 is an example of small cells in a cluster transmitting at the constrained transmission rates in a staggered fashion.

In another aspect, the small cells in the cluster may transmit at the constrained transmission rates in a staggered fashion. FIG. 10 illustrates one such example. FIG. 10 illustrates picocells P1, P2, P3, and P4. The cell P1 transmits the constrained rate signals. The cells P2-P4 transmit regular rate signals and CWIC-enabled rate signals. The UEs labeled IC perform CWIC. As shown, each picocell transmits at the constrained transmission rate on one subframe in a non-overlapping fashion. In this example, the reduced rate resources correspond to ABS (e.g., subframes that carry 0 rate; no data is scheduled). The picocell P1 transmits at the constrained transmission rate in subframe T1. Then P2, P3, and P4 transmit in turn in subframes T2-T4 in sequence. As shown in FIG. 10, the subframes T1-T4 are staggered in time (e.g., the subframes T1-T4 are non-overlapping).

In another aspect, each picocell may compute and transmit at its own constrained transmission rate ($R_c$). Several examples for the computing the constrained transmission rate ($R_c$) are presented below. There is a tradeoff in the selection the value of $R_c$. For example, a lower value of $R_c$ may provide a higher number of users that can apply interference cancellation but a higher loss in the users served by that picocell.

In one aspect, $R_c$ is calculated using the maximum rate $Rmax^{SI}$ of the interferer that the UE reports that it can decode. Examples of the calculation include:

Minimum $R_c$: $R_c$ is selected such that the minimum $R_{max}^{SI}$ value of all users interfered by the picocell is selected.

Maximum $R_c$: $R_c$ is selected such that the maximum $R_{max}^{SI}$ value of all users interfered by the picocell is selected. Thus, only one user can apply interference cancellation.

Mean/Median $R_c$: $R_c$ is selected such that the mean/median $Rmax^{SI}$ value of all users interfered by the picocell is selected.

x % tail $R_c$: $R_c$ is selected such that the $R_{max}^{SI}$ value corresponding to the x % of the $SINR^{SI}$ cumulative distribution function of users interfered by the picocell is selected.

Threshold $R_c$: $R_c$ is selected such that the minimum $R_{max}^{SI}$ for a set of users is selected. The set includes users with an interference cancellation gain (e.g., $SINR_{-1}(i)-SINR(i)$) being greater than a certain threshold.

Figure 11:
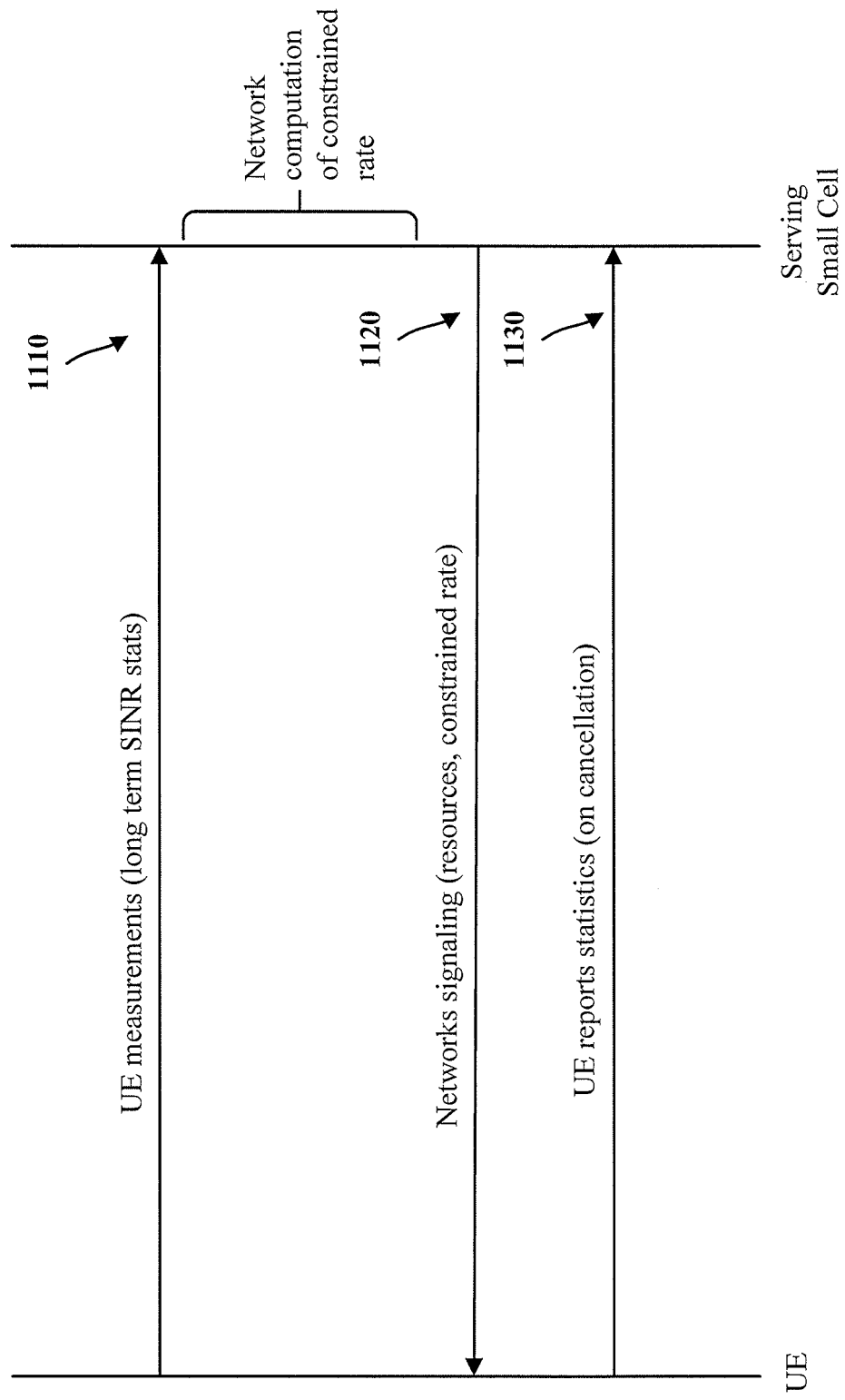
FIG. 11 is an example of the signaling between the UE and the serving cell.

FIG. 11 illustrates an example of the signaling between the UE and the serving cell. Referring to FIG. 9, the signaling may be between the serving cell 930 and the UE i 940.

At 1110, UE reports the measurement results (such as the long term SINR statistic) to the network (e.g., via the serving cell 930). For example, the UE i 940 may perform certain measurements (such as the long term SINR statistic) and report the measurement results to the serving cell 930, for computation of the constrained transmission rate. In one aspect, the UE i 940 may report measurements to reflect how dominant the strongest interferer is relative to other interferers and/or how much gain the UE i 940 may expect to gain from canceling the strongest interferer (e.g., the significance of the interference).

At 1120, the serving cell signals to the UE the reduced-rate resources and/or the constrained transmission rate. For example, the network may compute a constrained transmission rate on certain resources (e.g., time-frequency resources) for each of the small cells of the cluster. The network may compute the constrained transmission rate via message-passing of the UE measurements on the small cell cluster backhaul. In one aspect, each of the small cells may have different constrained transmission rates on different sets of resources. Such sets of resources may be called reduced-rate resources. The serving cell 930 signals an indication of the reduced-rate resources and/or the constrained transmission rates to the UE i 940, which may cancel an interfering transmission based on the received indication of the reduced-rate resources and/or the constrained transmission rates.

At 1130, the UE reports statistics on the result of interference cancellation. For example, the UE i 940 may report statistics of the result of the interference cancellation based on the received indication of the reduced-rate resources and/or the constrained transmission rates. As presented above, the process may be iterative, and the network may use the reported statistics to further refine the reduced-rate resources and/or the constrained transmission rate.

Figure 12:
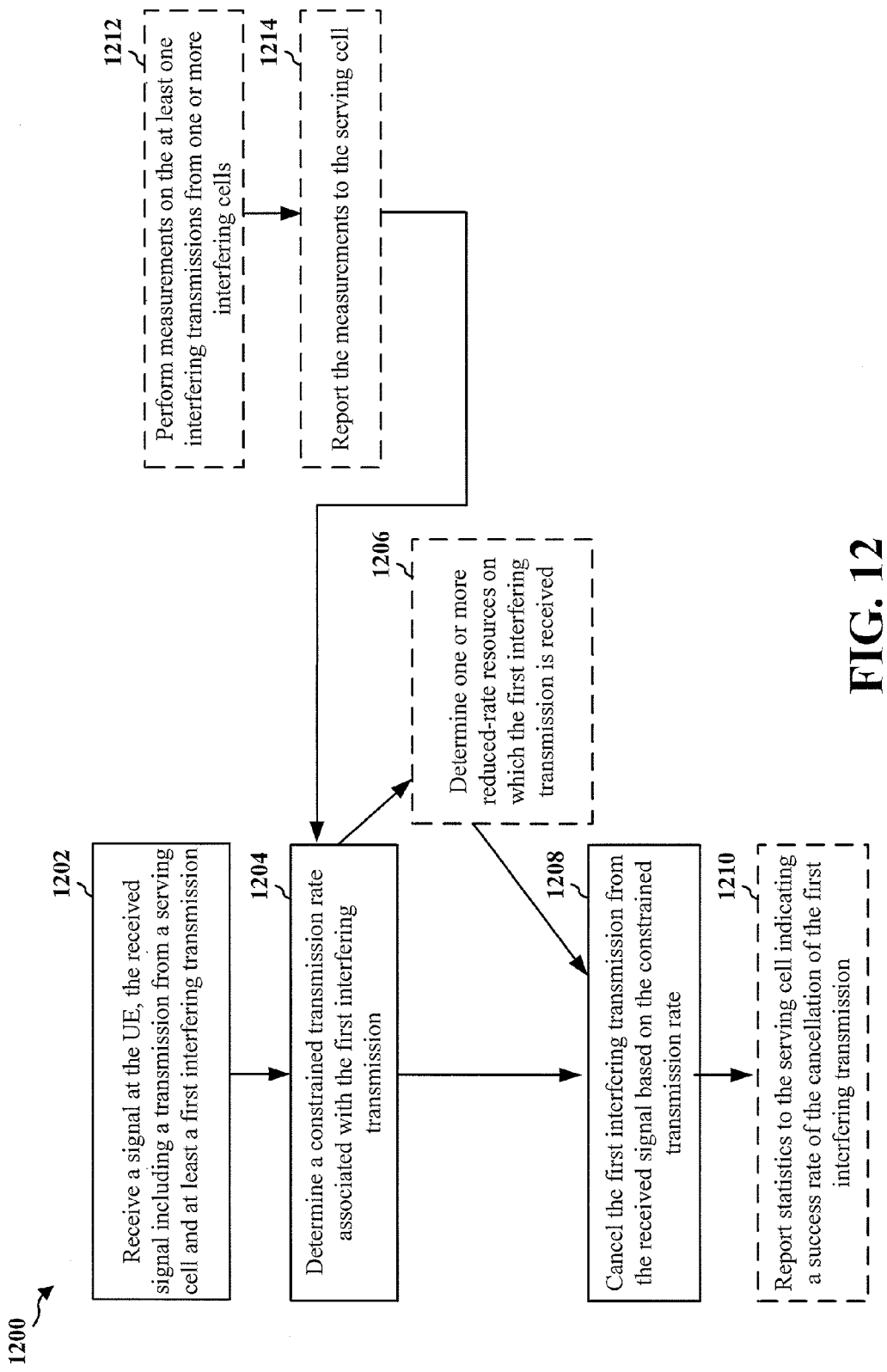
FIG. 12 is a flow chart of a method of wireless communication.

FIG. 12 is a flow chart 1200 of a method of wireless communication. The method may be performed by at least a UE. It should be understood that the steps indicated with dotted lines represent optional steps. The method may allow a UE to effectively cancel an interfering transmission.

At step 1202, the UE receives a signal that includes a transmission from a serving cell and at least a first interfering transmission. Referring to FIG. 9, for example, the UE i 940 receives a transmission from the serving cell 930 and an interfering transmission from the interfering cell 910.

At step 1204, a constrained transmission rate of associated with the first interfering transmission is determined. For example, the network may compute a constrained transmission rate on certain resources (e.g., time-frequency resources) for each of the small cells of the cluster. The network may compute the constrained transmission rate via message-passing of the UE measurements on the small cell cluster backhaul. In an aspect, the constrained transmission rate is a reduced transmission rate for facilitating cancellation of the first interfering transmission at the UE i 940. The serving cell 930 may signal the constrained transmission rate to the UE i 940. In one example, the UE i 940 determines the constrained transmission rate of the dominant interfering cell 910 based on the information received from the serving cell 930.

At step 1206, one or more reduced-rate resources of the dominant interfering cell on which the first interfering transmission is received are determined. For example, the network may compute a constrained transmission rate on certain resources (e.g., time-frequency resources) for each of the small cells of the cluster. The network may compute the constrained transmission rate via message-passing of the UE measurements on the small cell cluster backhaul. In one aspect, each of the small cells may have different constrained transmission rates on different sets of resources. Such sets of resources may be called reduced-rate resources. The serving cell 930 may signal the constrained transmission rate and an indication of the one or more reduced-rate resources to the UE i 940. In one example, the UE i 940 may determine the one or more reduced-rate resources based on the information received from the serving cell 930.

At step 1208, the UE cancels the first interfering transmission from the received signal based on the constrained transmission rate. Cancelling or mitigating a dominant interferer may improve the link capacity/reliability of the serving link. The term "cancel" may be used to refer to cancelling and/or mitigating an interfering signal. The interference cancellation or mitigation may be performed via, e.g., code word level interference cancellation (CWIC), Symbol level interference cancellation (SLIC), or using almost blank subframe (ABS) methods.

At step 1210, the UE reports statistics to the serving cell indicating a success rate of the cancellation of the first interfering transmission. For example, the UE i 940 may periodically report statistics of the cancellation performance to the serving cell 930 (which may then relay the information to the network). For example, the UE i 940 may report the success ratio of cancellation of the dominant interferer 910. The report may be binary information of whether the UE i 940 has canceled the interferer on the reduced-rate resources. Moreover, the UE i 940 may report to the serving cell 930 the potential link gain observed from the cancelation. In one aspect, the feedback may be coarse or approximated. In one aspect, these measurements may be used by the serving cell 930 to adapt its decisions on the reduced-rate resources and constrained transmission rate.

At step 1212, the UE performs measurements on interfering transmissions from one or more interfering cells. At step 1214, the measurements are reported to the serving cell. For example, the UE i 940 may perform certain measurements (such as the long term SINR statistic) and report the measurement results to the serving cell 930, for computation of the constrained transmission rate. In one aspect, the UE i 940 may report the measurements using L3 signaling (e.g., PUSCH). In another example, the UE i 940 may report the measurements using aperiodic L2 and L1 signaling.

Figure 13:
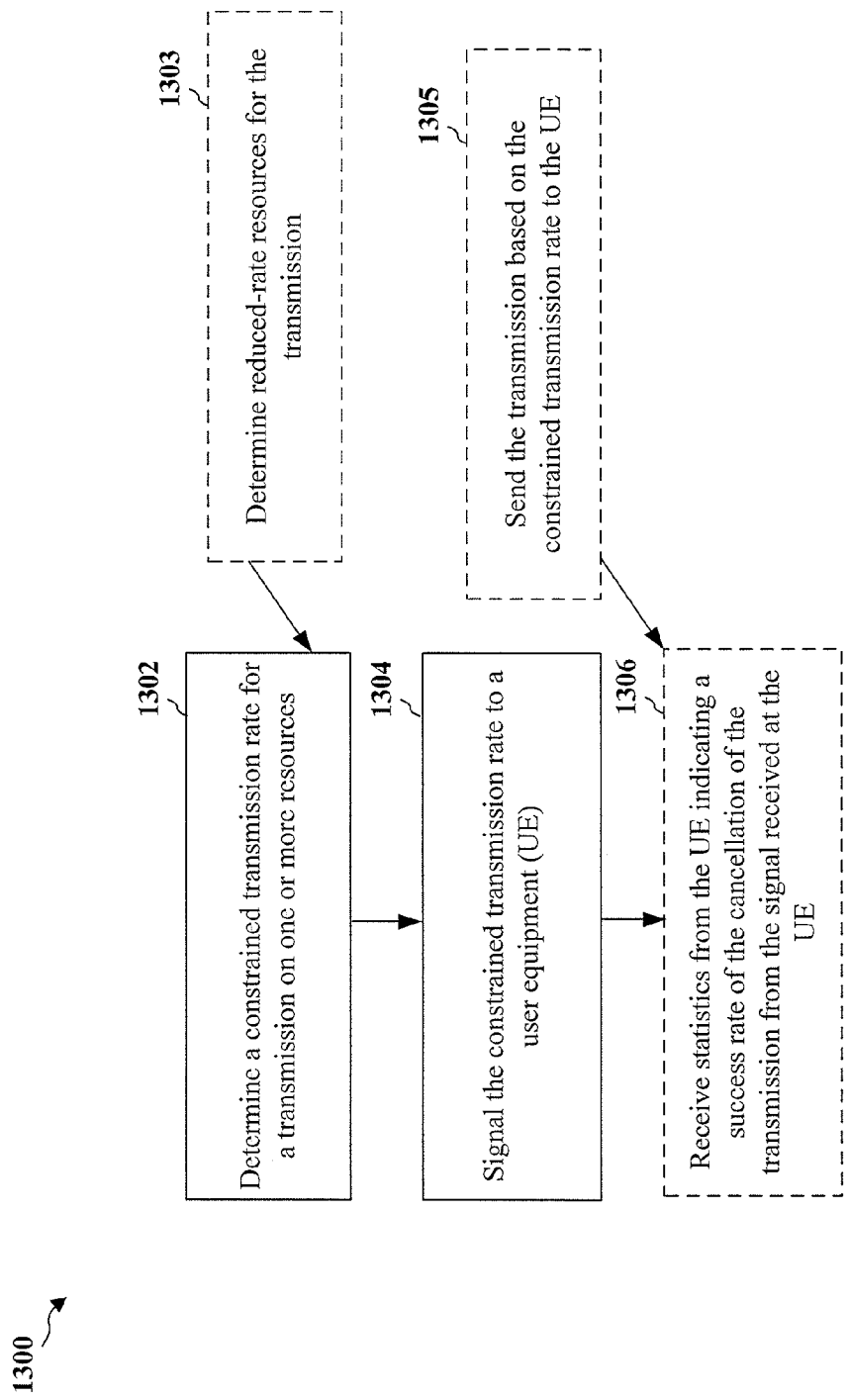
FIG. 13 is a flow chart of a method of wireless communication.

FIG. 13 is a flow chart 1300 of a method of wireless communication. It should be understood that the steps indicated with dotted lines represent optional steps. The method may be performed by an eNB in a network.

At step 1302, the eNB determines a constrained transmission rate for a transmission on one or more resources. Referring to FIG. 9, for example, the eNB determines a constrained transmission rate for a transmission (e.g., the interfering transmission from the dominant interfering cell 910) on one or more resources. For example, the eNB may compute a constrained transmission rate on certain resources (e.g., time-frequency resources) for each of the small cells of the cluster. The eNB may compute the constrained transmission rate via message-passing of the UE measurements on the small cell cluster backhaul. In one aspect, each of the small cells may have different constrained transmission rates on different sets of resources. Such sets of resources may be called reduced-rate resources.

At step 1303, the eNB determine reduced-rate resources for the transmission. For example, the reduced-rate resources may be a subset of time-frequency resources (e.g., subband and/or subframe) on which a given small cell transmits at a constrained transmission rate. In one example, the reduced-rate resource may be at subframe level of granularity (e.g., N out of every M subframes are configured to have reduced-rate).

At step 1304, the eNB signals the constrained transmission rate to a user equipment (UE). For example, the eNB may signal, via the serving cell 930, the constrained transmission rates to the UE i 940. The UE i 940 may cancel an interfering transmission based on the constrained transmission rates. In an aspect, the constrained transmission rate is a reduced transmission rate for facilitating cancellation of the transmission at the UE i 940. In an aspect, the constrained transmission rate is determined based on measurements from the UE i 940. In an aspect, the measurements indicate that the transmission causes substantially stronger interference than at least a second transmission received at the UE i 940. In an aspect, the measurements further indicate a gain expected by the UE i 940 after cancelation of the transmission from a signal received at the UE i 940.

At step 1305, the transmission based on the constrained transmission rate is sent to the UE. For example, the dominant interferer 910 may send the transmission based on the constrained transmission rate to the UE i 940. The UE i 940 may cancel the (interfering) transmission from the received signal based on the constrained transmission rate. Cancelling or mitigating a dominant interferer may improve the link capacity/reliability of the serving link. The term "cancel" may be used to refer to cancelling and/or mitigating an interfering signal. The interference cancellation or mitigation may be performed via, e.g., code word level interference cancellation (CWIC), Symbol level interference cancellation (SLIC), or using almost blank subframe (ABS) methods.

At step 1306, the eNB receives statistics from the UE indicating a success rate of the cancellation of the transmission from the signal received at the UE. For example, the UE i 940 may periodically report statistics of the cancellation performance via the serving cell 930. For example, the UE i 940 may report the success ratio of cancellation of the dominant interferer 910. The report may be binary information of whether the UE i 940 has canceled the interferer on the reduced-rate resources. Moreover, the UE i 940 may report via the serving cell 930 the potential link gain observed from the cancelation. In one aspect, the feedback may be coarse or approximated. In one aspect, these measurements may be used by the eNB to adapt its decisions on the reduced-rate resources and constrained transmission rate.

Figure 14:
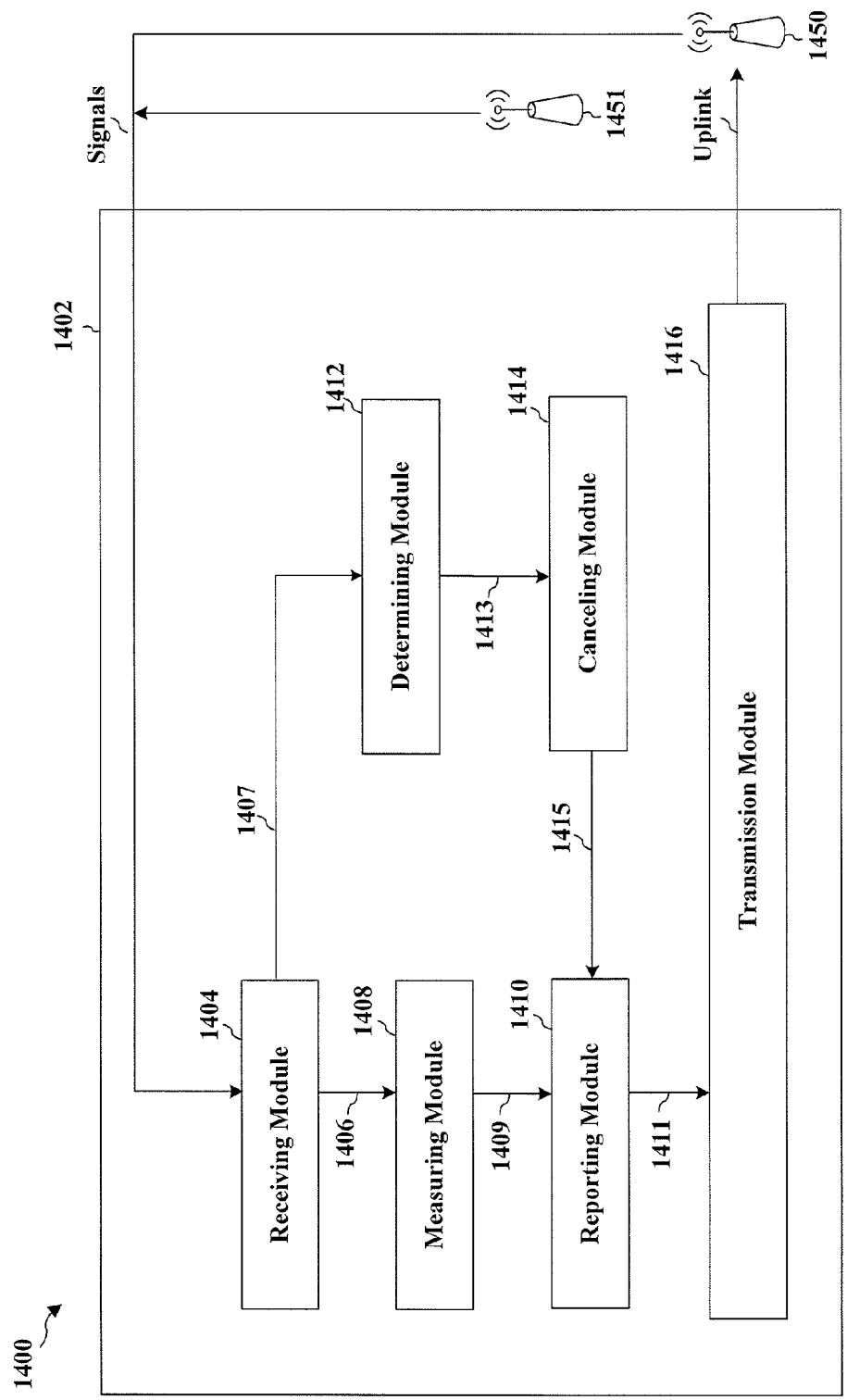
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a UE. The apparatus includes a receiving module 1404, a measuring module 1408, a reporting module 1410, a determining module 1412, a canceling module 1414, and a transmission module 1416.

The receiving module 1404 receives signals from a serving cell (e.g., eNB 1450) and at least a first interfering transmission from one or more interfering cells (e.g., eNB 1451). The receiving module 1404 provides received signal information 1406 to the measuring module 1408. The measuring module 1408 performs measurements on interfering transmissions from one or more interfering cells (e.g., eNB 1451) and provides the measurement result 1409 to the reporting module 1410.

The receiving module 1404 further receives configuration information for a constrained transmission rate and an indication of one or more reduced-rate resources (e.g., of an interfering cell such as eNB 1451) on received the signals. The receiving module 1404 provides information (1407) on the constrained transmission rate and the indication of one or more reduced-rate resources to the determining module 1412. The determining module 1412 determines the constrained transmission rate of the dominant interfering cell and/or the one or more reduced-rate resources of the dominant interfering cell based on information 1407 and provides the determined dominate interfering cell information 1413 to the canceling module 1414. The canceling module 1414 cancels the first interfering transmission from the received signal based on the constrained transmission rate and provides the cancellation information 1415 to the reporting module 1410. The reporting module 1410 reports the measurements to a network and/or reports statistics to a network indicating a success rate of the cancellation of the first interfering transmission. The reporting module 1410 provides the reporting information 1411 to the transmission module for uplink to, e.g., the eNB 1450.

The apparatus may include additional modules that perform each of the steps of the algorithm in the aforementioned flow chart of FIG. 12. As such, each step in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
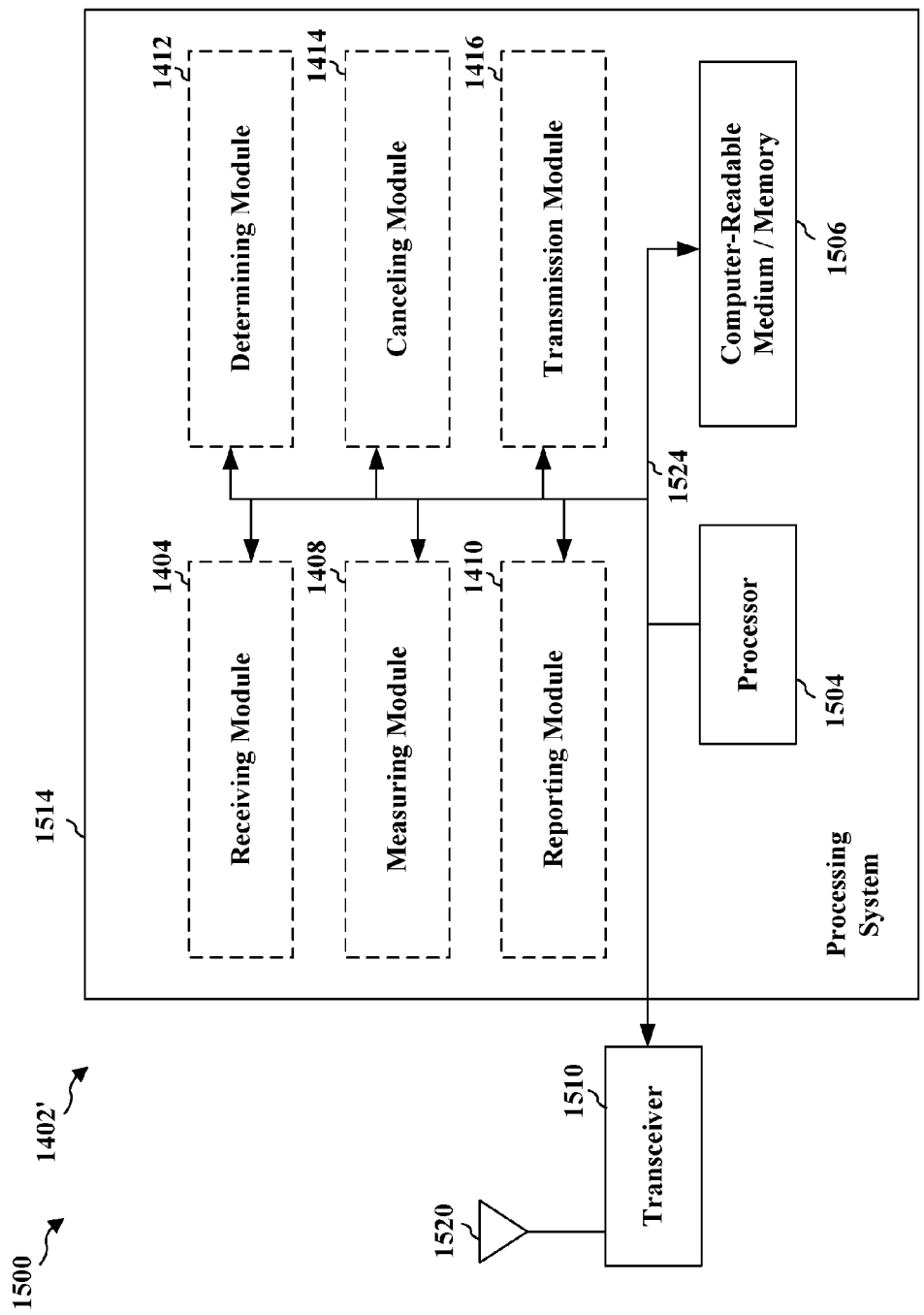
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1408, 1410, 1412, and 1414, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides means for communicating with various other apparatus over a transmission medium. The transceiver 1510 receives a signal from the one or more antennas 1520, extracts information from the received signal, and provides the extracted information to the processing system 1514, specifically the receiving module 1404. In addition, the transceiver 1510 receives information from the processing system 1514, specifically the transmission module 1416, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1404, 1408, 1410, 1412, and 1414. The modules may be software modules running in the processor 1504, resident/stored in the computer readable medium/memory 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402/1402' for wireless communication includes means for receiving a signal at the UE, means for receiving a signal, including a transmission from a serving cell and at least a first interfering transmission, at the UE; means for determining a constrained transmission rate associated with the first interfering transmission; means for canceling the first interfering transmission from the received signal based on the constrained transmission rate; means for performing measurements on interfering transmissions from one or more interfering cells; means for reporting the measurements to the serving cell; means for means for determining one or more reduced-rate resources on which the first interfering transmission is received; and means for reporting statistics to the serving cell indicating a success rate of the cancellation of the first interfering transmission. The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 16:
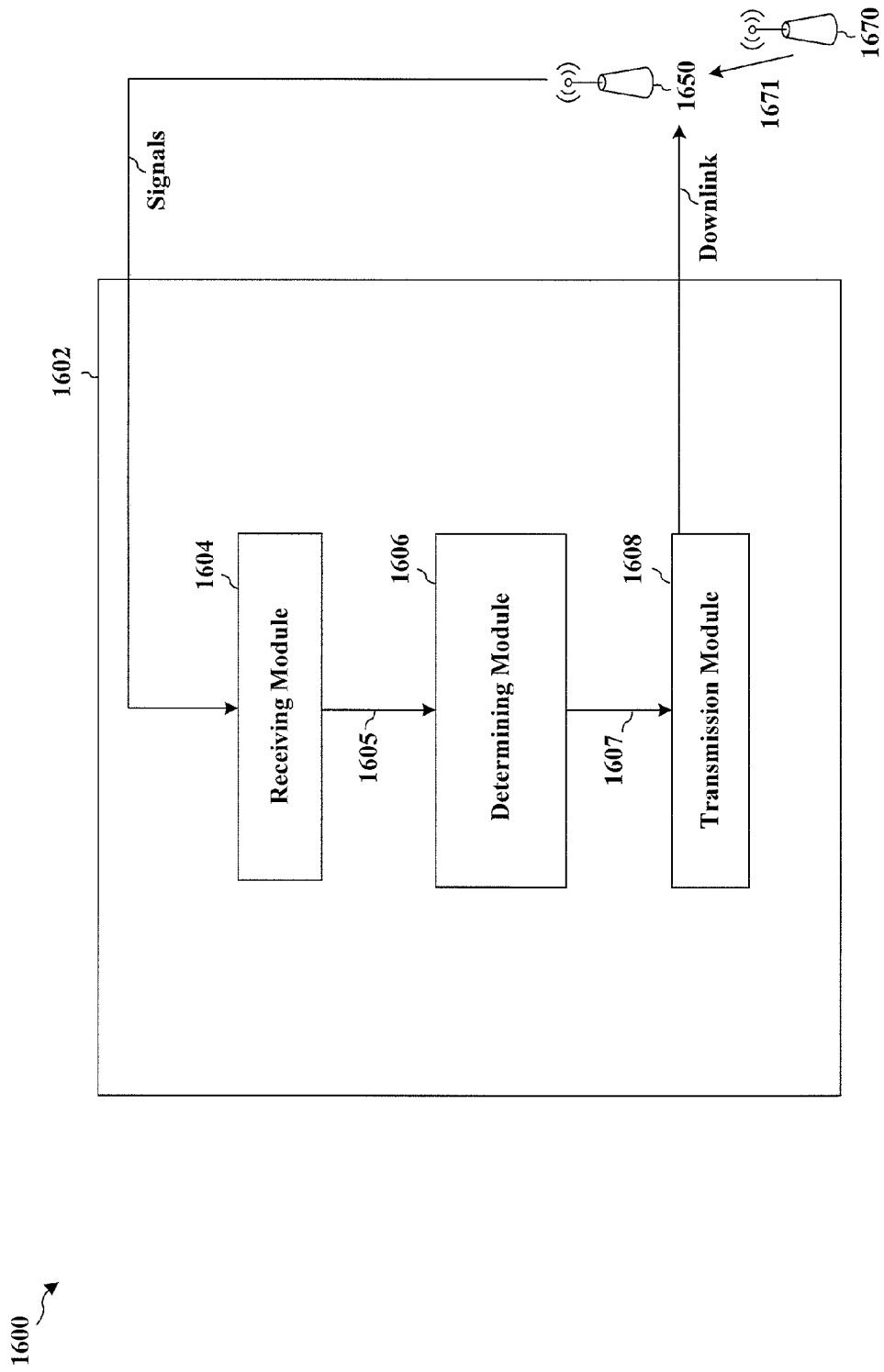
FIG. 16 is a conceptual data flow diagram illustrating the data flow between different modules/means/components in an exemplary apparatus.

FIG. 16 is a conceptual data flow diagram 1600 illustrating the data flow between different modules/means/components in an exemplary apparatus 1602. The apparatus may be an eNB. The apparatus includes a receiving module 1604, a determining module 1606, and a transmission module 1608. The receiving module 1604 receives signals including statistics from, e.g., the UE 1650 indicating a success rate of the cancellation of a transmission from the signal received at the UE 1650 (e.g., cancellation of the interfering transmission 1671 from a dominant interfering cell 1670) and/or measurement results (such as the long term SINR statistic). The eNB may receive the signals from the UE 1650 via a serving cell of the UE 1650. The receiving module 1604 provides the statistic or measurement information 1605 to the determining module 1606. The determining module 1606 determines a constrained transmission rate for the interfering transmission 1671 on one or more resources based on the received statistic or measurement information. The determining module 1606 may further determine reduced-rate resources for the transmission. The determining module 1606 provides the constrained transmission rate and/or the reduced-rate resources information 1607 to the transmission module 1608. The transmission module 1608 downlinks to the UE 1650 and provides the transmission rate to the UE 1650.

The apparatus may include additional modules that perform each of the steps of the algorithm in the aforementioned flow chart of FIG. 13. As such, each step in the aforementioned flow chart of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
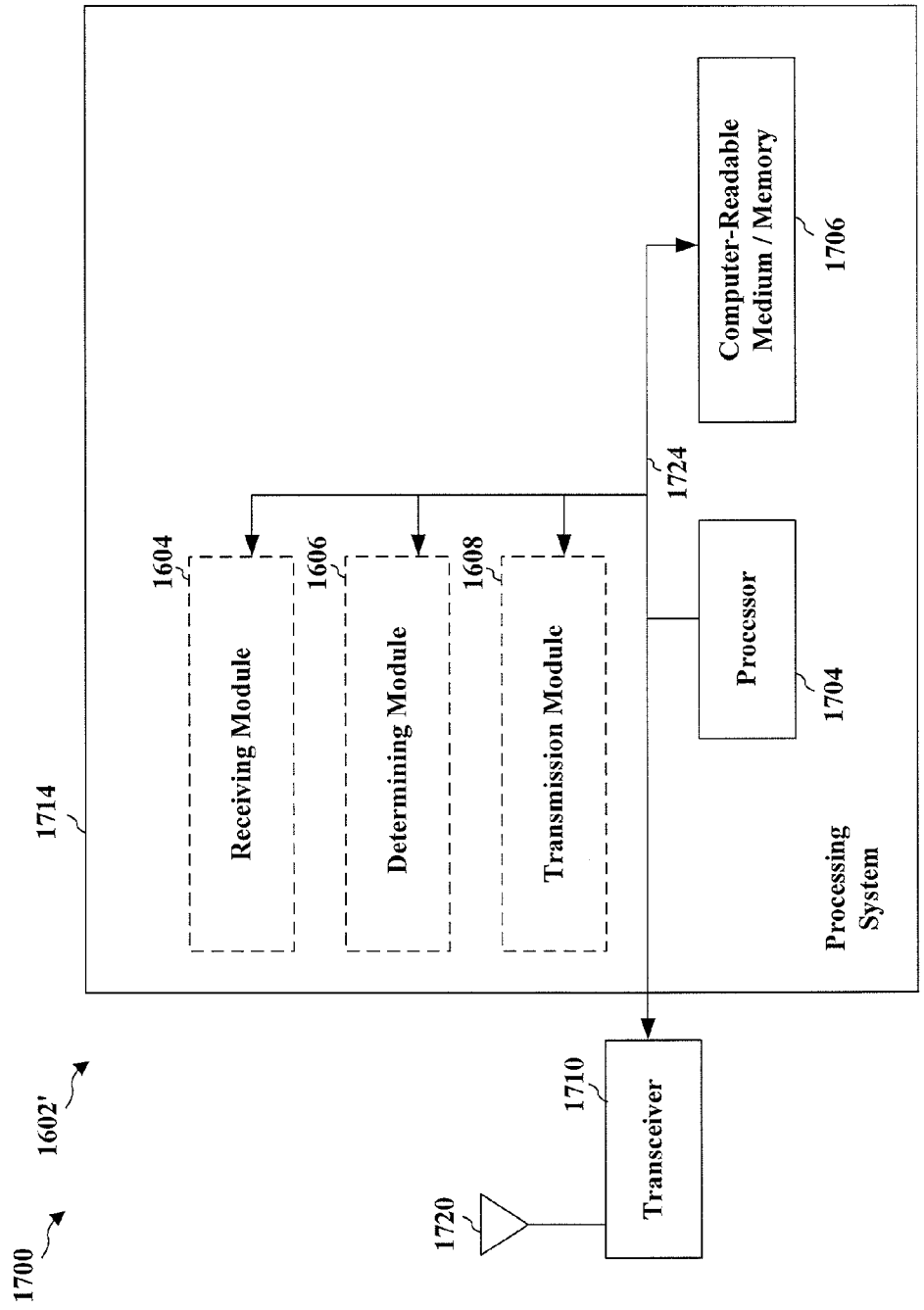
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1604, 1606, and 1608, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the receiving module 1604. In addition, the transceiver 1710 receives information from the processing system 1714, specifically the transmission module 1608, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system further includes at least one of the modules 1604, 1606, and 1608. The modules may be software modules running in the processor 1704, resident/stored in the computer readable medium/memory 1706, one or more hardware modules coupled to the processor 1704, or some combination thereof. The processing system 1714 may be a component of the eNB 610 and may include the memory 676 and/or at least one of the TX processor 616, the RX processor 670, and the controller/processor 675.

In one configuration, the apparatus 1602/1602' for wireless communication includes means for determining a constrained transmission rate for a transmission on one or more resources; means for determining reduced-rate resources for the transmission; means for signaling the constrained transmission rate to a UE; means for sending the transmission, which causes interference to a signal received at a UE, based on the constrained transmission rate; and means for receiving statistics from the UE indicating a success rate of the cancellation of the transmission from the signal received at the UE. The aforementioned means may be one or more of the aforementioned modules of the apparatus 1602 and/or the processing system 1714 of the apparatus 1602' configured to perform the functions recited by the aforementioned means. As described supra, the processing system 1714 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication for a user equipment (UE), comprising:
   receiving, at the UE, configuration information from a serving cell, the configuration information indicating a constrained transmission rate for a first interfering transmission from an interfering cell, wherein the constrained transmission rate comprises a limit placed on a transmission rate of the interfering cell transmitting the first interfering transmission that limits interference to a transmission from the serving cell that is attributable to the interfering cell, wherein the constrained transmission rate constrains the interfering cell to transmit the first interfering transmission using at least one of a lower transmission rate than a potentially higher transmission rate of the interfering cell or a modulation coding scheme (MCS) having a lower MCS index than a potential MCS index of the interfering cell;
   receiving a signal, at the UE, the received signal comprising the transmission from the serving cell and at least one interfering transmission, the at least one interfering transmission including the first interfering transmission from the interfering cell; and
   canceling, at the UE, the first interfering transmission from the received signal based on the constrained transmission rate for the first interfering transmission from the interfering cell indicated to the UE from the serving cell.

2. The method of claim 1, wherein the configuration information is received from the serving cell prior to receiving the first interfering transmission, and wherein the configuration information further includes an indication of one or more reduced-rate resources on which the constrained transmission rate is applied by the interfering cell in transmitting the first interfering transmission.

3. The method of claim 1, further comprising:
   performing measurements on the at least one interfering transmissions, the at least one interfering transmissions being from one or more interfering cells; and
   reporting the measurements to the serving cell.

4. The method of claim 3, wherein the one or more interfering cells includes a dominant interfering cell sending the first interfering transmission, which causes interference to the received signal substantially stronger than at least a second interfering transmission received at the UE.

5. The method of claim 4, wherein the measurements further indicate a gain expected by the UE after canceling the first interfering transmission from the received signal.

6. The method of claim 1, further comprising determining one or more reduced-rate resources on which the first interfering transmission is received, the one or more reduced-rate resources being configured with the constrained transmission rate,
   wherein the canceling the first interfering transmission from the received signal is performed on the one or more reduced-rate resources.

7. The method of claim 1, further comprising:
   reporting statistics to the serving cell indicating a success rate of the cancellation of the first interfering transmission.

8. The method of claim 1, wherein the constrained transmission rate constrains the interfering cell to transmit the first interfering transmission using the lower transmission rate than the potentially higher transmission rate of the interfering cell.

9. The method of claim 1, wherein the constrained transmission rate constrains the interfering cell to transmit the first interfering transmission using the MCS having the lower MCS index than potential MCS index of the interfering cell.

10. A user equipment (UE) for wireless communication, comprising:
    means for receiving at the UE configuration information from a serving cell, the configuration information indicating a constrained transmission rate for a first interfering transmission from an interfering cell, and receiving a signal at the UE, the received signal comprising a transmission from the serving cell and at least the first interfering transmission from the interfering cell, wherein the constrained transmission rate comprises a limit placed on a transmission rate of the interfering cell transmitting the first interfering transmission that limits interference to the transmission from the serving cell that is attributable to the interfering cell, wherein the constrained transmission rate constrains the interfering cell to transmit the first interfering transmission using at least one of a lower transmission rate than a potentially higher transmission rate of the interfering cell or a modulation coding scheme (MCS) having a lower MCS index than a potential MCS index of the interfering cell; and
    means for canceling the first interfering transmission from the received signal based on the constrained transmission rate for the first interfering transmission from the interfering cell indicated to the UE from the serving cell.

11. The UE of claim 10, wherein the means for receiving receive the configuration information from the serving cell prior to receiving the first interfering transmission, the configuration information further including
    an indication of one or more reduced-rate resources on which the constrained transmission rate is applied by the interfering cell in transmitting the first interfering transmission.

12. The UE of claim 10, further comprising:
    means for performing measurements on interfering transmissions from one or more interfering cells; and
    means for reporting the measurements to the serving cell.

13. The UE of claim 12, wherein the one or more interfering cells includes a dominant interfering cell sending the first interfering transmission, which causes interference to the received signal substantially stronger than at least a second interfering transmission received at the UE.

14. The UE of claim 13, wherein the measurements further indicate a gain expected by the UE after canceling the first interfering transmission from the received signal.

15. The UE of claim 10, further comprising:
means for determining one or more reduced-rate resources on which the first interfering transmission is received, the one or more reduced-rate resources being configured with the constrained transmission rate,
wherein the canceling the first interfering transmission from the received signal is further based on the one or more reduced-rate resources.

16. The UE of claim 10, further comprising:
means for reporting statistics to the serving cell indicating a success rate of the cancellation of the first interfering transmission.

17. An apparatus for wireless communication, comprising:
a memory; and
at least one processor coupled to the memory and configured to:
receive at the UE configuration information from a serving cell, the configuration information indicating a constrained transmission rate for a first interfering transmission from an interfering cell, wherein the constrained transmission rate comprises a limit placed on a transmission rate of the interfering cell transmitting the first interfering transmission that limits interference to a transmission from the serving cell that is attributable to the interfering cell, wherein the constrained transmission rate constrains the interfering cell to transmit the first interfering transmission using at least one of a lower transmission rate than a potentially higher transmission rate of the interfering cell or a modulation coding scheme (MCS) having a lower MCS index than a potential MCS index of the interfering cell;
receive a signal at the UE, the received signal comprising the transmission from the serving cell and at least one interfering transmission, the at least one interfering transmission including the first interfering transmission from the interfering cell; and
cancel the first interfering transmission from the received signal based on the constrained transmission rate for the first interfering transmission from the interfering cell indicated to the UE from the serving cell.

18. The apparatus of claim 17, wherein the at least one processor is further configured to receive configuration information from the serving cell prior to receiving the first interfering transmission, the configuration information further including
an indication of one or more reduced-rate resources on which the constrained transmission rate is applied by the interfering cell in transmitting the first interfering transmission.

19. The apparatus of claim 17, wherein the at least one processor is further configured to:
perform measurements on the at least one interfering transmissions, the at least one interfering transmissions being from one or more interfering cells; and
report the measurements to the serving cell.

20. The apparatus of claim 19, wherein the one or more interfering cells includes a dominant interfering cell sending the first interfering transmission, which causes interference to the received signal substantially stronger than at least a second interfering transmission received at the UE.

21. The apparatus of claim 20, wherein the measurements further indicate a gain expected by the UE after canceling the first interfering transmission from the received signal.

22. The apparatus of claim 17, wherein the at least one processor is further configured to determine one or more reduced-rate resources on which the first interfering transmission is received, the one or more reduced-rate resources being configured with the constrained transmission rate,
wherein the canceling the first interfering transmission from the received signal is performed on the one or more reduced-rate resources.

23. The apparatus of claim 17, wherein the at least one processor is further configured to:
report statistics to the serving cell indicating a success rate of the cancellation of the first interfering transmission.

24. A non-transitory computer-readable medium storing computer executable code, comprising code to:
receive at the UE, configuration information from a serving cell, the configuration information indicating a constrained transmission rate for a first interfering transmission from an interfering cell, wherein the constrained transmission rate comprises a limit placed on a transmission rate of the interfering cell transmitting the first interfering transmission that limits interference to a transmission from the serving cell that is attributable to the interfering cell, wherein the constrained transmission rate constrains the interfering cell to transmit the first interfering transmission using at least one of a lower transmission rate than a potentially higher transmission rate of the interfering cell or a modulation coding scheme (MCS) having a lower MCS index than a potential MCS index of the interfering cell;
receive a signal at the UE, the received signal comprising the transmission from the serving cell and at least one interfering transmission, the at least one interfering transmission including the first interfering transmission from the interfering cell; and
cancel the first interfering transmission from the received signal based on the constrained transmission rate for the first interfering transmission from the interfering cell indicated to the UE from the serving cell.

25. The computer-readable medium of claim 24, wherein the code is further configured to receive the configuration information from the serving cell prior to receiving the first interfering transmission, the configuration information further including
an indication of one or more reduced-rate resources on which the constrained transmission rate is applied by the interfering cell in transmitting the first interfering transmission.

26. The computer-readable medium of claim 24, wherein the code is further configured to:
perform measurements on the at least one interfering transmissions, the at least one interfering transmissions being from one or more interfering cells; and
report the measurements to the serving cell.

27. The computer-readable medium of claim 26, wherein the one or more interfering cells includes a dominant interfering cell sending the first interfering transmission, which causes interference to the received signal substantially stronger than at least a second interfering transmission received at the UE.

28. The computer-readable medium of claim 27, wherein the measurements further indicate a gain expected by the UE after canceling the first interfering transmission from the received signal.

29. The computer-readable medium of claim 24, wherein the code is further configured to determine one or more reduced-rate resources on which the first interfering transmission is received, the one or more reduced-rate resources being configured with the constrained transmission rate,
- wherein the canceling the first interfering transmission from the received signal is performed on the one or more reduced-rate resources.

30. The computer-readable medium of claim 24, wherein the code is further configured to:
- report statistics to the serving cell indicating a success rate of the cancellation of the first interfering transmission.

* * * * *